United States Patent
Osborn

(10) Patent No.: US 9,248,415 B2
(45) Date of Patent: Feb. 2, 2016

(54) SYSTEMS AND METHODS FOR MAXIMIZING DISSOLVED GAS CONCENTRATION OF A SINGLE SPECIES OF GAS FROM A MIXTURE OF MULTIPLE GASES

(75) Inventor: Gregory Scott Osborn, Fayetteville, AR (US)

(73) Assignees: Board of Trustees of the University of Arkansas, Little Rock, AR (US); BlueInGreen, LLC, Fayetteville, AR (US)

( * ) Notice: Subject to any disclaimer, the term of this patent is extended or adjusted under 35 U.S.C. 154(b) by 496 days.

(21) Appl. No.: 13/600,950

(22) Filed: Aug. 31, 2012

(65) Prior Publication Data

US 2013/0026110 A1    Jan. 31, 2013

Related U.S. Application Data

(63) Continuation-in-part of application No. 11/921,057, filed on Nov. 7, 2008, now Pat. No. 8,276,888, which is a continuation of application No. 11/137,856, filed on May 25, 2005, now Pat. No. 7,255,332, application (Continued)

(51) Int. Cl.
*B01F 3/04* (2006.01)
*B01F 5/04* (2006.01)
(Continued)

(52) U.S. Cl.
CPC ............ *B01F 3/0473* (2013.01); *B01F 3/0876* (2013.01); *B01F 5/0463* (2013.01);
(Continued)

(58) Field of Classification Search
CPC .... B01F 5/0463; B01F 5/0498; B01F 3/0473; B01F 3/0876; B01F 2003/04886; C02F 1/78; C02F 7/00; C02F 2209/40; C02F 2209/005; C02F 2209/02; Y02W 10/15

USPC ........ 261/28, 37, 77, 78.2, 115, 119.1, 122.1, 261/124; 210/760, 192, 205, 221.2
See application file for complete search history.

(56) References Cited

U.S. PATENT DOCUMENTS

| | | | |
|---|---|---|---|
| 3,643,403 | A | 2/1972 | Speece |
| 3,772,187 | A | 11/1973 | Othmer |

(Continued)

FOREIGN PATENT DOCUMENTS

| | | |
|---|---|---|
| DE | 35 01 175 A1 | 7/1986 |
| JP | 08132094 | 5/1996 |

(Continued)

OTHER PUBLICATIONS

Extended European Search Report; European Patent Office; European Patent Application No. 06771268.7 (Oct. 23, 2012).

(Continued)

*Primary Examiner* — Charles Bushey
(74) *Attorney, Agent, or Firm* — Richard Blakely Glasgow

(57) ABSTRACT

An apparatus and method for maximizing the dissolved concentration of ozone in a liquid. The apparatus includes a dissolution tank having a pressure vessel configured to contain a treated fluid and at least one gas in a head space above the treated fluid, an inlet configured to permit passage of an untreated fluid into the head space, and an outlet configured to permit passage of the treated fluid out of the vessel; a gas supply system configured to transport the at least one gas to the head space; a fluid supply system configured to provide the untreated fluid to the tank; a bleed-off system for removing gas from the head space so as to maximize the dissolved concentration of the ozone gas in the liquid; and a discharge device configured to pass the treated fluid from the tank into the target liquid.

13 Claims, 6 Drawing Sheets

Related U.S. Application Data

No. 13/600,950, which is a continuation-in-part of application No. 13/415,402, filed on Mar. 8, 2012.

(60) Provisional application No. 60/574,152, filed on May 25, 2004, provisional application No. 61/450,364, filed on Mar. 8, 2011, provisional application No. 61/543,858, filed on Oct. 6, 2011, provisional application No. 61/652,692, filed on May 29, 2012.

(51) Int. Cl.
    *B01F 3/08* (2006.01)
    *C02F 1/78* (2006.01)
    *C02F 7/00* (2006.01)

(52) U.S. Cl.
    CPC ............. *B01F5/0498* (2013.01); *C02F 1/78* (2013.01); *C02F 7/00* (2013.01); *B01F 2003/04886* (2013.01); *C02F 2209/005* (2013.01); *C02F 2209/02* (2013.01); *C02F 2209/40* (2013.01); *Y02W 10/15* (2013.01)

(56) References Cited

U.S. PATENT DOCUMENTS

| | | |
|---|---|---|
| 3,856,671 A | 12/1974 | Lee et al. |
| 3,932,282 A | 1/1976 | Ettelt |
| 3,960,066 A | 6/1976 | LaRocco et al. |
| 4,086,152 A | 4/1978 | Rich et al. |
| 4,132,637 A | 1/1979 | Key et al. |
| 4,163,712 A | 8/1979 | Smith |
| 4,256,574 A | 3/1981 | Bhargava |
| 4,317,731 A | 3/1982 | Roberts, Jr. et al. |
| 4,461,426 A | 7/1984 | Christopher |
| 4,501,664 A | 2/1985 | Heil et al. |
| 4,652,382 A * | 3/1987 | Edwards et al. .............. 210/752 |
| 4,735,750 A | 4/1988 | Damann |
| 4,863,643 A * | 9/1989 | Cochran .......................... 261/76 |
| 4,981,582 A | 1/1991 | Yoon et al. |
| 5,275,742 A | 1/1994 | Satchell, Jr. et al. |
| 5,376,265 A | 12/1994 | Szabo |
| 5,382,358 A | 1/1995 | Yeh |
| 5,451,349 A | 9/1995 | Kingsley |
| 5,487,835 A | 1/1996 | Shane |
| 5,514,264 A | 5/1996 | Shane |
| 5,569,180 A | 10/1996 | Spears |
| 5,637,231 A | 6/1997 | Hill et al. |
| 5,647,977 A | 7/1997 | Arnaud |
| 5,674,312 A * | 10/1997 | Mazzei ........................... 95/261 |
| 5,735,934 A | 4/1998 | Spears |
| 5,766,484 A | 6/1998 | Petit et al. |
| 5,865,995 A * | 2/1999 | Nelson .......................... 210/205 |
| 5,885,467 A | 3/1999 | Zelenak et al. |
| 5,904,851 A | 5/1999 | Taylor et al. |
| 5,911,870 A | 6/1999 | Hough |
| 5,951,921 A | 9/1999 | Koganezawa et al. |
| 5,968,421 A * | 10/1999 | Schattney et al. ............... 261/49 |
| 5,979,363 A | 11/1999 | Shaar |
| 6,076,808 A | 6/2000 | Porter |
| 6,090,294 A | 7/2000 | Teran et al. |
| 6,153,111 A | 11/2000 | Conrad et al. |
| 6,193,893 B1 | 2/2001 | Mazzei et al. |
| 6,279,882 B1 | 8/2001 | Littman et al. |
| 6,280,633 B1 | 8/2001 | Conrad et al. |
| 6,284,138 B1 | 9/2001 | Mast |
| 6,315,893 B1 * | 11/2001 | Sawada .......................... 210/86 |
| 6,344,489 B1 | 2/2002 | Spears |
| 6,372,131 B1 | 4/2002 | Mirowsky |
| 6,474,627 B2 | 11/2002 | Speece |
| 6,485,003 B2 | 11/2002 | Speece |
| 6,488,271 B1 * | 12/2002 | Nelson et al. .............. 261/121.1 |
| 6,503,403 B2 * | 1/2003 | Green et al. .............. 210/748.1 |
| 6,530,895 B1 | 3/2003 | Keirn |
| 6,555,059 B1 | 4/2003 | Myrick et al. |
| 6,565,807 B1 | 5/2003 | Patterson |
| 6,568,661 B1 | 5/2003 | Shane |
| 6,637,731 B2 | 10/2003 | Shane |
| 6,730,214 B2 | 5/2004 | Mazzei |
| 6,767,008 B2 | 7/2004 | Shane |
| 6,817,541 B2 | 11/2004 | Sands et al. |
| 6,840,983 B2 | 1/2005 | McNulty |
| 6,848,258 B1 | 2/2005 | Speece |
| 6,855,291 B2 | 2/2005 | Patterson et al. |
| 6,877,726 B1 | 4/2005 | Rindt et al. |
| 6,936,179 B2 | 8/2005 | DeWald |
| 6,962,654 B2 | 11/2005 | Arnaud |
| 6,964,738 B1 | 11/2005 | Shen |
| 6,983,929 B2 | 1/2006 | Shane |
| 7,008,535 B1 * | 3/2006 | Spears et al. .................. 210/220 |
| 7,255,332 B2 * | 8/2007 | Osborn et al. ................. 261/28 |
| 7,294,278 B2 | 11/2007 | Spears et al. |
| 7,566,397 B2 | 7/2009 | Speece |
| 7,622,036 B2 | 11/2009 | Morse |
| 7,695,622 B2 | 4/2010 | Fabiyi |
| 7,833,410 B2 | 11/2010 | Morse |
| 8,276,888 B2 * | 10/2012 | Osborn et al. ................. 261/28 |
| 8,919,743 B2 * | 12/2014 | Osborn et al. ................. 261/28 |
| 2002/0134736 A1 | 9/2002 | Burris et al. |
| 2002/0158012 A1 | 10/2002 | Christodoulatos |
| 2003/0071372 A1 | 4/2003 | Scherzinger et al. |
| 2003/0183584 A1 * | 10/2003 | Galatro et al. ................ 210/760 |
| 2003/0209502 A1 | 11/2003 | Lacasse et al. |
| 2005/0040548 A1 | 2/2005 | Lee et al. |
| 2008/0017590 A1 | 1/2008 | Suchak et al. |
| 2009/0101572 A1 | 4/2009 | Sullivan |

FOREIGN PATENT DOCUMENTS

| | | |
|---|---|---|
| JP | 2001-347146 | 12/2001 |
| JP | 2004 188263 | 8/2005 |
| JP | 2004188263 | 8/2005 |
| WO | 0211870 A2 | 2/2002 |

OTHER PUBLICATIONS

Examiner's Report: Australian Patent Application No. 2006249808, Australian Patent Office (issued May 27, 2010).
Japanese Office Action: Japanese Patent Application No. 2008-513750, Japanese Patent Office (issued Feb. 1, 2011) (Japanese).
Japanese Office Action: Japanese Patent Application No. 2008-513750, Japanese Patent Office (issued Feb. 1, 2011) (English).
Examination Report: New Zealand Patent Application No. 563542, New Zealand Patent Office (issued Dec. 15, 2010).
Mexican Office Action: Mexican Patent Application No. MX/a/2007/014750, Mexican Patent Office (issued Mar. 17, 2011) (Spanish).
Mobley Engineering, Side Stream Super-Saturation, http://www.mobleyengineering.com/technologies/hydropowerenhancements.html (last visited May 23, 2012).
Japanese Decision of Final Rejection: Japanese Patent Application No. 2008-513750, Japanese Patent Office (issued Feb. 7, 2012) (English).
Japanese Decision of Final Rejection: Japanese Patent Application No. 2008-513750, Japanese Patent Office (issued Feb. 7, 2012) (Japanese).
Examiners Report: Canadian Patent Application No. 2,609,030, Canadian Intellectual Property Office (issued Jan. 15, 2013).
Communication: European Patent Application No. 06 771 268.7, European Patent Office (issued Oct. 8, 2013).
Communication: European Patent Application No. 06 771 268.7, European Patent Office (issued Jan. 22, 2015).
Office Action, U.S. Appl. No. 13/601,124 (issued May 19, 2015).
Office Action, U.S. Appl. No. 13/600,859 (issued Jul. 15, 2013).
Office Action, U.S. Appl. No. 13/600,859 (issued May 19, 2014).
Office Action, U.S. Appl. No. 13/600,859 (issued Nov. 7, 2013).
Office Action, U.S. Appl. No. 13/415,402 (issued Mar. 24, 2015).
Office Action, U.S. Appl. No. 13/415,539 (issued Apr. 1, 2015).
Office Action, U.S. Appl. No. 13/415,402 (issued Aug. 24 2015).
Communication: European Patent Application No. 06 771 268.7, European Patent Office (issued Jul. 15, 2015).

* cited by examiner

Figure 2: Ozone gas concentration in headspace of saturation tank with no bleed off. Tank initially filed with 10% mass concentration of ozone then pressurized for operation.

Figure 3: Dissolved ozone concentration is water exiting the saturation tank with no bleed off.

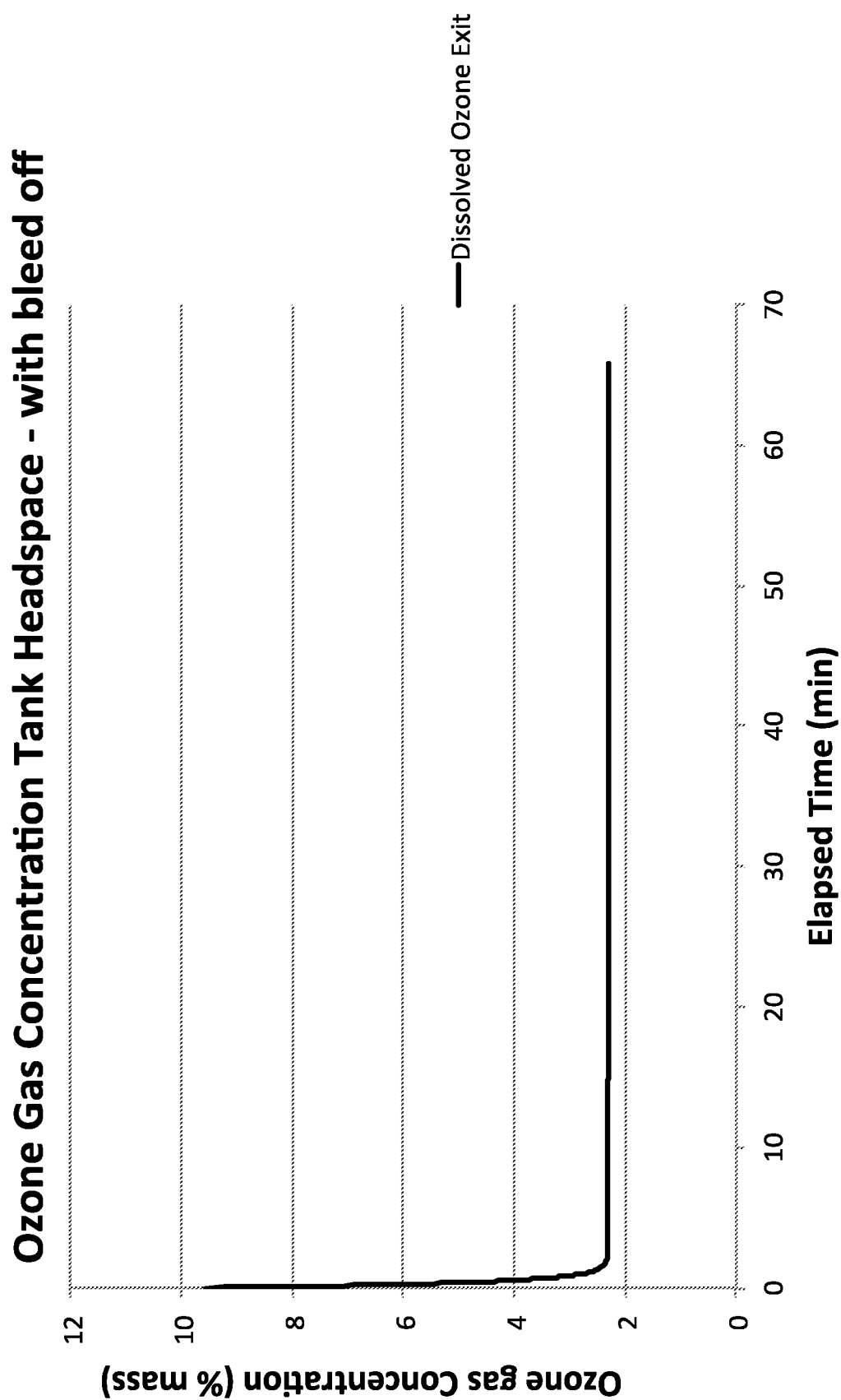
FIG. 5: Ozone gas concentration in saturation tank headspace with bleed off.

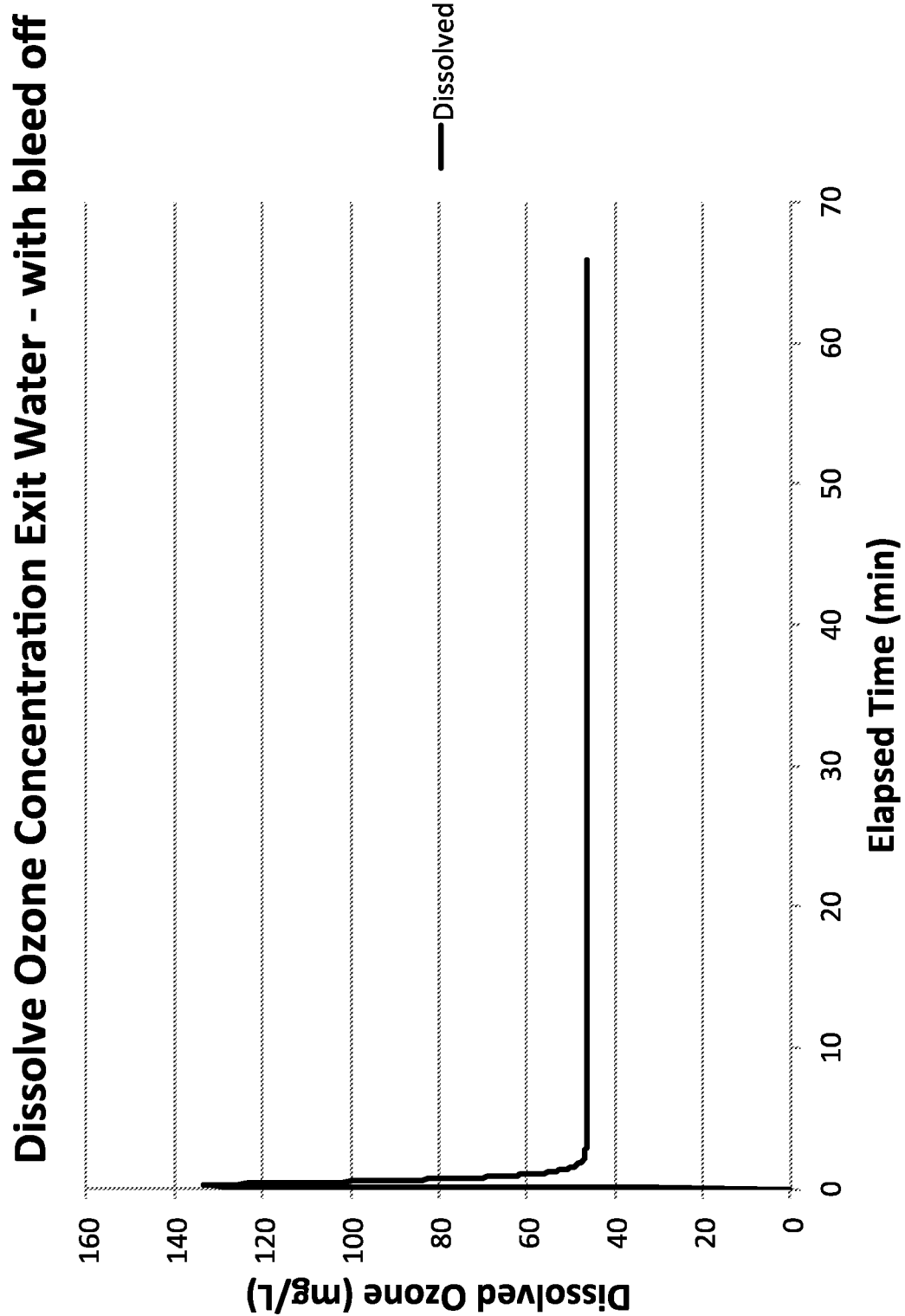
FIG 6: Dissolved ozone in water exiting the saturation tank using gas bleed off system.

SYSTEMS AND METHODS FOR MAXIMIZING DISSOLVED GAS CONCENTRATION OF A SINGLE SPECIES OF GAS FROM A MIXTURE OF MULTIPLE GASES

CROSS-REFERENCE TO RELATED APPLICATIONS

This application is a continuation-in-part application of, and claims the benefit of, U.S. patent application Ser. No. 11/921,057, filed Nov. 7, 2008 and issued as U.S. Pat. No. 8,276,888 on Oct. 2, 2012, which is the national stage entry of International Patent Application No. PCT/US2006/020391, which claims the benefit of U.S. patent application Ser. No. 11/137,856, filed May 25, 2005 and now issued as U.S. Pat. No. 7,255,332, which in turn claims priority to U.S. Provisional Application No. 60/574,152, filed on May 25, 2004. This application is also a continuation-in-part application of, and claims the benefit of, U.S. patent application Ser. No. 13/415,402, filed Mar. 8, 2012, entitled "System and Method for Optimizing the Dissolution of a Gas in a Liquid," which in turn claims priority to U.S. Provisional Application No. 61/450,364, filed on Mar. 8, 2011. This application also claims the benefit of U.S. Provisional Application No. 61/543,858, filed on Oct. 6, 2011, and U.S. Provisional Application No. 61/652,692, filed on May 29, 2012, both entitled "Systems and Methods for Maximizing Dissolved Gas Concentration of a Single Species of Gas from a Mixture of Multiple Gases." The disclosures of each of the above-referenced applications are herein incorporated by reference in their entirety.

STATEMENT REGARDING FEDERALLY SPONSORED RESEARCH

Research and development of the invention described in this disclosure has been supported, at least in part, by a grant to BlueInGreen LLC from the National Institutes of Health (grant number 2R32ES014137-02). Additionally, the present invention has been supported at least in part by the National Science Foundation SBIR Program, Grant No. IIP-0750402DMI-041955. The Government has certain rights to the invention.

BACKGROUND OF THE INVENTION

1. Field of the Invention

This invention relates to systems and methods for maximizing the dissolution concentration of a single gas species in a liquid from a source gas containing multiple species of gases. More specifically, this invention is directed to systems and methods for maximizing the concentration of dissolved ozone gas in a liquid, such as water, by periodically or continuously dissolving ozone in the liquid that is sprayed through a gas feed of ozone and oxygen while removing excess oxygen gas from the headspace of the saturation tank used in the dissolution system.

2. Background of the Related Art

Many different systems and methods are available for dissolving gases in liquids and are highly dependent on the needed application. Some of the main applications that require dissolving gases into liquids include the oxygenation of outdoor water bodies, industrial uses, and the treatment of wastewater and drinking water. Most dissolved gas delivery methods—bubble diffusion, Venturi injection, U-tubes, and Speece cones, for example—are based on increasing the contact time or surface area of gas bubbles introduced into a bulk liquid to enhance mass transfer. Previous technologies for dissolving gas into a liquid have features that increase the contact time or contact area between gas bubbles and the bulk fluid to increase dissolution.

Most, if not all, of these earlier technologies require recovery systems for off-gases that do not dissolve into the fluid or allow loss of undissolved gases. For example, U.S. Pat. No. 5,979,363 to Shaar describes an aquaculture system that involves piping a food and oxygen slurry into a pond. U.S. Pat. No. 5,911,870 to Hough discloses a device for increasing the quantity of dissolved oxygen in water and employs an electrolytic cell to generate the oxygen. U.S. Pat. No. 5,904,851 to Taylor discloses a method for enriching water with oxygen that employs a Venturi-type injector to aspirate gas into a fluid, followed by mixing to increase dissolution. U.S. Pat. No. 5,885,467 to Zelenak discloses mixing a liquid with oxygen using a plurality of plates or trays over which the liquid flows gradually downward. U.S. Pat. No. 4,501,664 to Heil discloses a device for treating organic wastewater with dissolved oxygen that employs several process compartments. U.S. Pat. No. 5,766,484 to Petit describes a dissolved gas flotation system for treatment of wastewater wherein the relative location of inlet and outlet structures reportedly maximizes the effect of air bubbles in separating solids from the fluid. U.S. Pat. No. 5,647,977 to Arnaud describes a system for treating wastewater that includes aeration, mixing/flocculating, and contact media for removing suspended solids. U.S. Pat. No. 5,382,358 to Yeh discloses an apparatus for separation of suspended matter in a liquid by dissolved air flotation. And U.S. Pat. No. 3,932,282 to Ettelt discloses a dissolved air flotation system that includes a vertical flotation column designed with an aim of preventing bubble breakage.

Other U.S. patents describe various methods of increasing the contact time between gas bubbles in fluids, including U.S. Pat. No. 5,275,742 to Satchell; U.S. Pat. No. 5,451,349 to Kingsley; U.S. Pat. No. 5,865,995 to Nelson; U.S. Pat. No. 6,076,808 to Porter; U.S. Pat. No. 6,090,294 to Teran; U.S. Pat. No. 6,503,403 to Green; and U.S. Pat. No. 6,840,983 to McNulty. Spears, et al. (U.S. Pat. Nos. 7,294,278; 7,008,535) describe a method for varying the dissolved oxygen concentration in a liquid by varying the pressure from 14.7 to 3000 psi inside an oxygenation assembly. Patterson, et al. (U.S. Pat. No. 6,565,807) describe a method for maintaining, adjusting, or otherwise controlling the levels of oxygen dissolved in blood (e.g., $pO_2$) by controlling the flow rates or by providing controlled amounts of the blood or oxygen gas.

These conventional systems for dissolving gases in liquids, and in particular conventional dissolved ozone delivery systems, are based on dissolving bubbles into stationary or flowing water and are greatly limited in the range of dissolved ozone concentration that can be attained and controlled. These conventional systems are also limited to nearly continuous use at constant dissolved ozone concentration, and cannot quickly adjust dissolved ozone concentrations to optimize water treatment cost and effectiveness. Bubble-based technology is limited to much lower dissolved ozone concentration in the water being treated because of lower pressure and less-efficient gas transfer.

U.S. Pat. No. 7,255,332, issued to the present inventor and incorporated herein by reference in its entirety, discloses a system and method for dissolving gases in fluids and for the delivery of dissolved gases. The system disclosed in U.S. Pat. No. 7,255,332 includes a saturation tank, a high pressure liquid pump in fluid communication with the tank, and a pressurized gas source in communication with a regulated gas headspace of the saturation tank. The saturation tank includes a pressure vessel for containing the liquid and has a pressure regulated gas headspace above the liquid, which contains at least one inlet that permits passage of liquid into the pressure vessel, and an outlet for the liquid containing dissolved gas. Upon passing the gas-containing liquid into a second fluid, the gas dissolved in the liquid is released to the water being treated in dissolved form. U.S. application Ser. No. 13/415, 402, filed on Mar. 8, 2012, and entitled SYSTEM AND METHOD FOR OPTIMIZING THE DISSOLUTION OF A GAS IN A LIQUID, describes an improvement to the system disclosed in U.S. Pat. No. 7,255,332. FIG. 1 illustrates the system described in U.S. application Ser. No. 13/415,402 which optimizes and controls the dissolution of ozone or other gas in a liquid within a pressure vessel by regulating vessel pressure, flow rate of a liquid into the vessel, retention time of the gas and liquid in the vessel, gas flow rate, liquid spray pattern, and internal mixing within the vessel. The optimal operating vessel pressure, flow rate of the liquid, retention time of the gas and liquid in the vessel, gas flow rate, liquid spray pattern, and internal mixing within the vessel may be determined based on the operating characteristics of an ozone generator.

In comparison to the systems described previously in this disclosure, the systems disclosed in U.S. Pat. No. 7,255,332 and U.S. application Ser. No. 13/415,402 are capable of providing superior dissolved gas levels in a liquid. However, in ozone applications the rate of dissolved ozone delivered from the system will be at a maximum when the unit is first activated, but will fall to a lower steady-state rate within 15 minutes.

Accordingly, there is a need for systems and methods for continuing to maximize the concentration of a gas dissolved in a liquid. The systems and methods described in this disclosure meet this need.

SUMMARY OF THE INVENTION

The present invention is directed to an apparatus for maximizing the dissolved concentration of ozone in a liquid. The apparatus includes: a dissolution tank assembly having a pressure vessel that defines a saturation chamber for containing the liquid and for providing a regulated gas headspace above the liquid; at least one inlet that permits the passage of the liquid into the gas headspace, and an outlet that permits passage of ozonated liquid out of the saturation chamber of the pressure vessel.

A gas source is in communication with the saturation chamber of the pressure vessel and provides a gas that has a first ozone-oxygen concentration. A pump supplies the liquid into the saturation chamber of the pressure vessel through the at least one inlet under conditions effective to dissolve ozone gas in the fluid. A bleed-off system removes gas having a second ozone-oxygen concentration from the gas headspace, so as to maximize the concentration of dissolved ozone gas into the liquid. A discharge device is in communication with the outlet of the dissolution tank assembly, wherein the discharge device is provided with at least one orifice through which the ozonated liquid is discharged from the saturation chamber of the pressure vessel.

As will be discussed hereinbelow, it is envisioned that the bleed-off system can be operated in a periodic or a continuous mode with either a single pressure vessel or multiple vessels operating in concert to provide a continuous stream of liquid containing a maximum concentration of dissolved ozone.

In a preferred embodiment, the gas source is in communication with an ozone generator. In such an embodiment, the gas that is removed from the gas headspace may be provided to the ozone generator. Moreover, in certain constructions of the present invention, the bleed-off system includes a control valve and a water vapor removal system for conditioning the gas removed from the gas headspace.

Alternately, the gas that is removed from the gas headspace may be provided to processes external to the invention to improve overall process economics by reusing the gas in the headspace. For example, the gas removed from the headspace may be injected into wastewater upstream or downstream of the invention to either ozonate or oxygenate the wastewater being treated.

Preferably, the gas source provides the gas having the first ozone-oxygen concentration to the saturation chamber of the pressure vessel below the water level inside the tank.

It is envisioned that when the apparatus is operating in a continuous mode, the mass concentration of ozone in the gas headspace is above about 2%. Moreover, when operating in a continuous mode, the liquid discharged from the dissolution tank of the pressure vessel preferably has an equivalent dissolved ozone concentration of about between 2 mg/L and about 50 mg/L not accounting for any ozone demand exerted from within the liquid passing through the saturation chamber of the pressure vessel.

The present invention is also directed to a method for optimizing the continuous dissolution of ozone in a liquid. In the inventive method a dissolution tank assembly is provided, which includes (i) a pressure vessel that defines a saturation chamber for containing the liquid and for providing a regulated gas headspace above the liquid, (ii) at least one inlet that permits passage of the liquid into the gas headspace, and (iii) an outlet that permits passage of ozonated liquid out of the saturation chamber of the pressure vessel.

Liquid is supplied into the saturation chamber of the pressure vessel through the at least one inlet under conditions effective to dissolve ozone gas in the fluid. Additionally, a gas source in communication with the saturation chamber of the pressure vessel provides a gas, which includes a first ozone-oxygen concentration. The gas having a second ozone-oxygen concentration is bleed-off from the gas headspace so as to maximize the concentration of dissolved ozone into the liquid; and ozonated liquid is discharged from the outlet of the dissolution tank assembly.

Preferably, in the inventive method of the present invention, there are three representative modes of operation to maximize dissolved ozone concentration into the liquid: 1) the gas is bled-off continuously, 2) the gas is bled-off periodically from the gas headspace with continuous liquid entry into the saturation chamber of the pressure vessel, or 3) the gas is bled-off periodically from the gas headspace with periodic pulsing liquid spray into the saturation chamber of the pressure vessel.

In a representative method of the first operational mode, the liquid spray enters the saturation chamber of the pressure vessel continuously while the gas is continuously fed from the source into the saturation chamber of the pressure vessel. The bleed-off of the headspace is also conducted continuously from the saturation chamber of the pressure vessel. The addition rate of liquid and gas to the saturation chamber of the pressure vessel and the bleed-off rate are such that a constant pressure is maintained inside the saturation chamber of the pressure vessel during operation.

In a representative method of the second operational mode, the liquid spray enters the saturation chamber of the pressure vessel continuously. The periodic gas bleed-off operation is conducted by initially permitting feed gas to flow into the saturation chamber of the pressure vessel with the bleed-off valve closed until a desired pressure in the chamber is attained. When the desired chamber pressure is reached, the inlet gas valve is closed thus stopping the flow of gas fed from the source into the saturation chamber of the pressure vessel. The flow rate of liquid into the saturation chamber of the pressure vessel is equal to the flow rate of liquid out of the saturation chamber of the pressure vessel as controlled by a level indicator/transmitter that controls the flow of liquid entering the saturation chamber of the pressure vessel. The gas in the headspace is slowly consumed without replacement as it is dissolved into the liquid stream thereby reducing the pressure in the saturation chamber of the pressure vessel. Once the pressure in the saturation chamber of the pressure vessel reaches an optimal value as determined by the optimal concentration of the remaining target gas (ozone) in the headspace gas, the bleed-off valve is opened releasing the remaining gas headspace from the chamber such that the pressure in the saturation chamber of the pressure vessel is near ambient pressure. The bleed-off valve is then closed and the feed gas inlet valve opened allowing feed gas to once again pressurize the saturation chamber of the pressure vessel to the initial desired optimal pressure. Programmable control over liquid flow rate entering the saturation chamber of the pressure vessel will maintain liquid level at desired values during periodic operation of the gas headspace bleed-off.

In a representative method of the third operational mode, the initial pressurized feed gas flows into the dissolution tank that is initially at a pressure near atmospheric. The dissolution tank is initially nearly full with liquid while the bleed-off valve is closed. The liquid exit valve is opened and the pressurized feed gas pushes the liquid out of the saturation chamber of the pressure vessel through the liquid exit on the bottom of the saturation chamber of the pressure vessel. Therefore, the saturation chamber of the pressure vessel is filled with feed gas at the initial concentration (of ozone/oxygen mixture) as the liquid is being displaced from the vessel. Once filled with gas at a pressure slightly above ambient, the gas feed valve is closed and the liquid input valve is opened allowing liquid spray to pass through the gas headspace thereby dissolving gas into the liquid. The liquid exit valve is closed so liquid cannot exit the saturation chamber of the pressure vessel. The liquid level in the chamber will rise, thereby pressurizing the contents of the chamber including the gas. Once the liquid level reaches the optimal level indicated by pressure and/or dissolved gas concentration, the liquid outlet valve is opened allowing the gas saturated liquid to exit the saturation chamber of the pressure vessel. Once the liquid level is reduced to the optimal level determined by pressure or liquid flow rate, the liquid exit valve is closed and the liquid entry valve is opened once again allowing liquid spray to enter the chamber and raise the liquid level and pressure. The bleed-off valve remains closed thereby causing the gas to become pressurized as the liquid fills the tank. The liquid entry valve is once again closed when the optimal level or pressure is reached and the liquid exit valve is opened thereby releasing the liquid saturated with gas. This pulsing process is repeated while the gas headspace is retained in the chamber until all of the usable target gas is extracted from the headspace and dissolved into the liquid. Once the gas headspace is optimally consumed, the bleed-off valve is opened, the liquid exit valve is closed, and the liquid spray entry valve is opened to fill the saturation chamber of the pressure vessel with liquid thereby forcing nearly all of the gas to exit the chamber. Once the gas has been removed from the saturation chamber of the pressure vessel, the process is repeated by closing the bleed-off valve, opening the liquid exit valve and the feed gas entry valve, and filling the saturation chamber of the pressure vessel with feed gas to a pressure slightly exceeding ambient.

Additionally, as discussed above, more than one dissolution tank assembly can be provided and the periodic bleed-off step can be conducted by: (a) providing a second pressure vessel assembly that is arranged in parallel with the first pressure vessel assembly; (b) filling the first pressure vessel with feed gas from the ozone generator until a desired ozone/oxygen pressure is achieved; (c) closing a valve associated with the first pressure vessel to seal the first pressure vessel from the gas feed; (d) providing the feed gas to the pressure vessel assembly which has separate bleed-off timing; and (e) filling the second pressure vessel with feed gas from the ozone generator until a desired ozone/oxygen pressure is achieved. The two or more pressure vessel assemblies can be similarly operated at different timings to fill or evacuate the liquid portion of the saturation chamber of the pressure vessel thereby providing a near continuous stream of liquid with dissolved gas and allow a continuous feed of gas to the series of pressure vessels.

These and other features and benefits of the subject invention and the manner in which it is assembled and employed will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the subject invention appertains will readily understand how to make and use the systems and methods of the subject invention without undue experimentation, preferred embodiments thereof will be described in detail hereinbelow with reference to certain figures, wherein:

FIG. 5 is a graphical representation showing the change in ozone concentration over time in the headspace of the dissolution tank of the system shown in FIG. 4;

FIG. 6 is a graphical representation illustrating the change in ozone concentration over time in the water exiting the dissolution tank of the system shown in FIG. 4.

These and other aspects of the subject invention will become more readily apparent to those having ordinary skill in the art from the following detailed description of the preferred embodiments of the invention taken in conjunction with the drawings.

DETAILED DESCRIPTION OF PREFERRED EMBODIMENTS

Disclosed herein are detailed descriptions of specific embodiments of the systems and methods of the present invention for maximizing the concentration of a dissolved gas in a liquid. It will be understood that the disclosed embodiments are merely examples of ways in which certain aspects of the invention can be implemented and do not represent an exhaustive list of all of the ways the invention may be embodied. Indeed, it will be understood that the systems, devices, and methods described herein may be embodied in various and alternative forms. The figures are not necessarily to scale and some features may be exaggerated or minimized to show details of particular components. Well-known components, materials or methods are not necessarily described in great detail in order to avoid obscuring the present disclosure.

Figures illustrating the components show some elements that are known and will be recognized by one skilled in the art. The detailed descriptions of such elements are not necessary to an understanding of the invention, and accordingly, are herein presented only to the degree necessary to facilitate an understanding of the novel features of the present invention.

For purposes of explanation and illustration, and not limitation, the system for optimization the dissolution of a gas in a liquid as disclosed in U.S. application Ser. No. 13/415,402 will first be described below prior to discussing how the present invention improves upon the performance of that system and other prior art systems. All of the details of the previously disclosed system will not be provided herein, but the contents of U.S. application Ser. No. 13/415,402 are incorporated by reference into the present disclosure.

Figure 1:
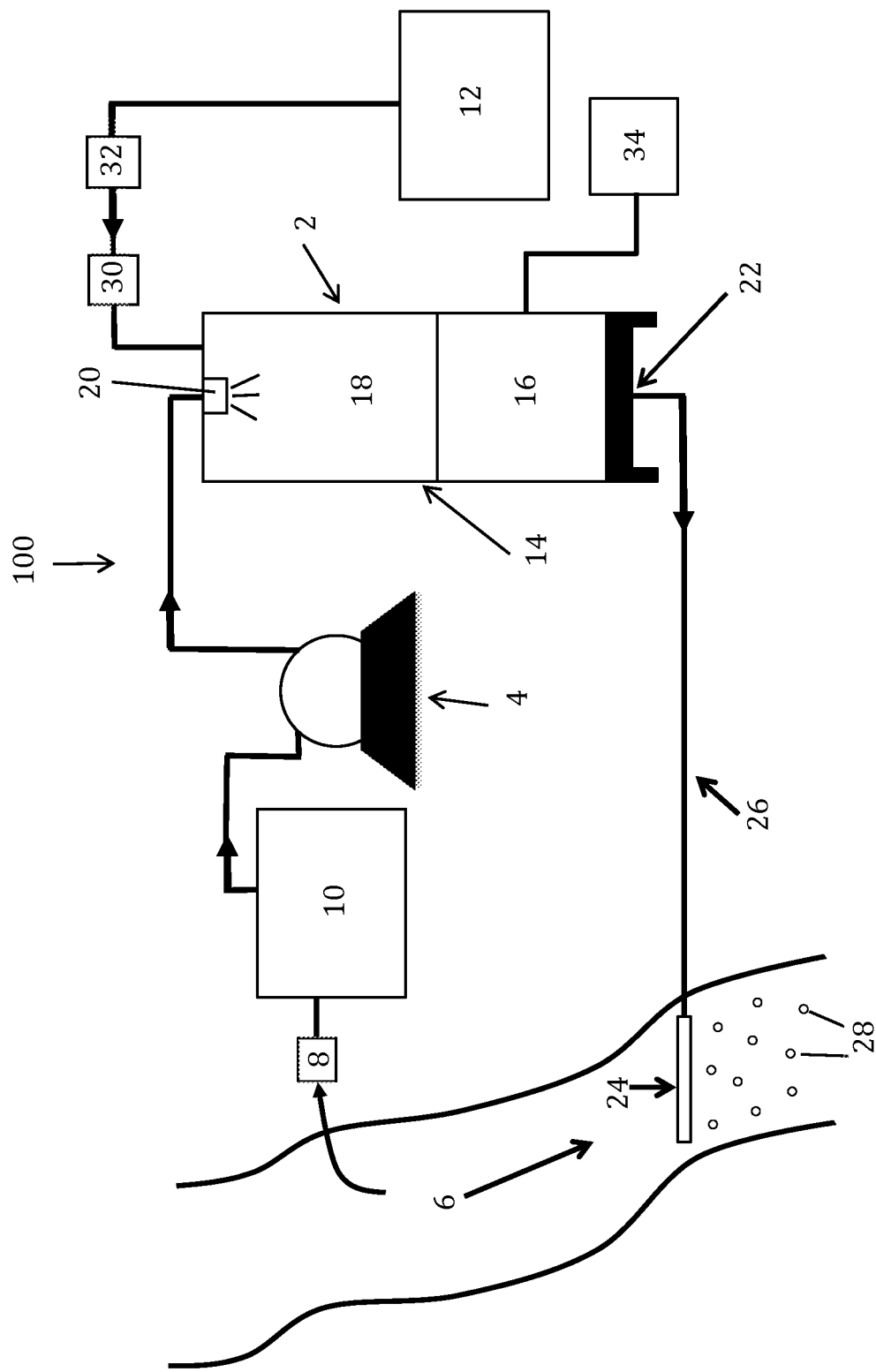
FIG. 1 is a schematic diagram of the system for optimizing the dissolution of a gas in a liquid as disclosed in U.S. patent application Ser. No. 13/415,402.

FIG. 1 illustrates the prior system for optimization the dissolution of a gas in a liquid, which has been designated generally by the reference numeral 100. System 100 includes a dissolution tank 2, and a pump 4 in fluid communication with the dissolution tank. Fluid flows into pump 4 from a stream or other fluid source 6. In one exemplary embodiment, the fluid enters through an intake passage, into a filter 8 and into a supply tank 10 before flowing into pump 4.

A gas source 12 is also in fluid communication with dissolution tank 2 and is configured to supply a quantity of gas to dissolution tank 2. The dissolution tank 2 includes a pressure vessel 14 for containing treated fluid 16 and provides a gas headspace 18 above the treated fluid. The gas headspace 18 is at a super-atmospheric pressure. Dissolution tank 2 also includes one or more inlets 20, configured to allow fluid being pumped from pump 4 into pressure vessel 14 of dissolution tank 2. The inlet 20 may include a spray nozzle. Dissolution tank 2 also includes an outlet 22, configured to permit the gasified fluid 16 to flow through a connector 26 and into a discharge device 24. In certain applications, the discharge device 24 is positioned within a stream 6 downstream of the intake passage. The now-gasified fluid may then be discharged into stream 6, for example by passing through one or more outlet orifices in discharge device 24. As a result of the fluid passing through system 100, dissolved gas 28 is released into stream 6 without the gas exiting the dissolved form and remaining dissolved in stream 6. Dissolved gas 28 is preferably oxygen, ozone, hydrogen, nitrogen, nitrous oxide, or carbon dioxide. The liquid is typically composed primarily of water.

In addition to the components described above, system 100 also includes a pressure regulator 30 and a generator 32 situated between gas source 12 and pressure vessel 14 such that the gas flowing from gas source 12 passes through generator 32 and pressure regulator 30 before entering pressure vessel 14. Generator 32 and pressure regulator 30 may be arranged in either order, that is, system 100 may also be configured such that the gas flows through pressure regulator 30 first and then through generator 32. System 100 may also include one or more programmable logic controllers or other control devices 34 interfacing with system 100 to allow for automated adjustment of various parameters within system 100, including, but not limited to, pressure within vessel 14, flow rate of the fluid 16 into and out of pressure vessel 14, retention time of gas and liquid in vessel 14, gas flow rate into vessel 14, the liquid spray pattern from inlets 20, and the rate of internal mixing within vessel 14.

Although the schematic shown in FIG. 1 shows control device 34 connected to pressure vessel 14, it should be understood that system 100 may include a plurality of control devices 34 interfacing with any of the various parts of system 100 and with each other. Control devices 34 may be hardwired or they may operate wirelessly, and may be able to be controlled remotely through a network. In addition, control devices 34 may be any suitable device, including mechanical or other manually operated devices.

In one exemplary embodiment, gas source 12 supplies oxygen to system 100 and generator 32 is an ozone generator. To control dissolution of ozone gas into the liquid flowing through the pressurized, enclosed vessel 14 while maintaining a constant flow rate of the fluid through the vessel, an operator of system 100 may increase the operating efficiency of the system by delivering an optimal concentration of dissolved ozone to the liquid at the lowest total operating cost. Additionally, the operator may manipulate the operating parameters to control the rate of ozone dissolution to achieve a desired ozone concentration downstream of discharge device 24 in stream 6.

U.S. patent application Ser. No. 13/415,402 discloses several methods for optimizing the dissolution of ozone in a liquid using system 100. For example, disclosed is a method of producing the highest possible dissolved ozone concentration with a given ozone generator 32. Additionally, the provisional application discloses developing a pressure vs. dissolved ozone gas concentration correlation, which allows an operator to control the concentration of dissolved ozone by adjusting the pressure of vessel 14. Still further, another way to increase the total amount of dissolved gas in the liquid passing through pressure vessel 14 is to vary the liquid flow rate through the vessel. By lowering the flow rate of the liquid, the mass transfer efficiency between the gas phase and the liquid phase increases, approaching the maximum concentration—as determined by chemical equilibrium. Still further, U.S. application Ser. No. 13/415,402 discloses that retention time in pressure vessel 14 can be increased by increasing the size of the vessel. This will allow more gas-liquid contact, improving the transfer efficiency. Moreover, liquid temperature can also be used to optimize or control the concentration of dissolved gas leaving pressure vessel 14. The characteristics will depend on the gas-liquid combination being used in the system. In general, gases are more soluble in liquid at lower temperatures; by using a colder liquid, or by cooling the liquid passing through pressure vessel 14, more gas can be dissolved into the liquid as it passes through the vessel. U.S. application Ser. No. 13/415,402 discloses details that each of the methods described above may be programmed into control device 34 or any other programmable logic controller. Any of these operating parameters may be used to control the amount of dissolved gas in the second, receiving portion of the liquid, using a commercially available instrument appropriate for detection of the gas in the liquid and modulating the controlled parameter through the programmable logic controller or other device 34. When compared to the system described in U.S. Pat. No. 7,255,332, system 100 has the ability to control dissolved gas delivery with much greater precision.

Figure 4:
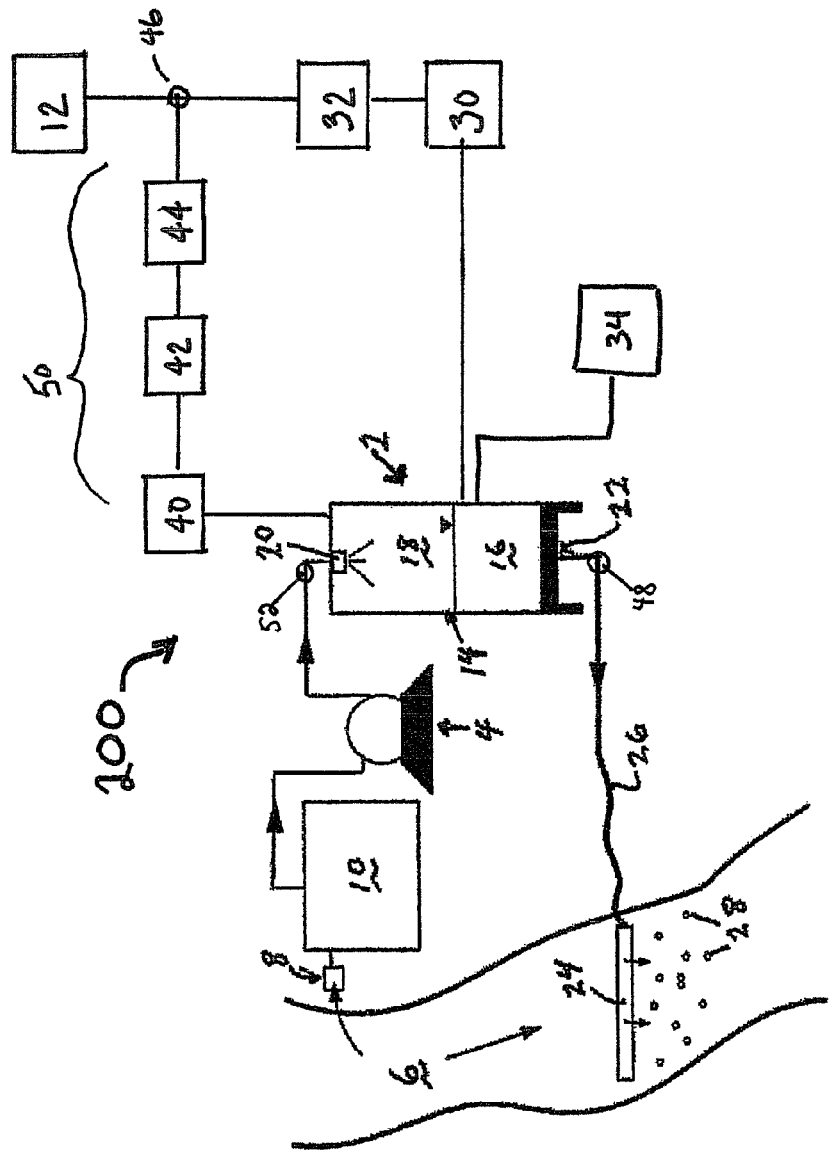
FIG. 4 is a schematic diagram of a system for optimizing the continuous dissolved gas concentration dissolution which has been constructed according to an embodiment of the present invention.

The present invention, which will be described with respect to FIGS. 4-6, improves upon the performance of system 100, even when operating at steady-state conditions. An embodiment of the system for maximizing the concentration a dissolved gas in a liquid of the present invention is illustrated in FIG. 4 and has been designated as reference numeral 200. System 200 is similar in structure and operation to system 100, but differs in a couple of significant ways. First, a bleed-off system has been added which, as will be discussed in detail below, removes gas from within the gas headspace. Second, in the embodiment shown in this figure, gas is supplied from the gas generator 32 to the saturation chamber of the pressure vessel assembly below the liquid level. Component parts that are shared between system 100 and system 200 have been identified using the same reference numerals.

Like system 100, system 200 passes water/fluid into a gas headspace 18 within a pressure vessel 14 to more effectively dissolve gas into water than previously achieved using prior art systems. As the gas is pressurized in the headspace 18, it is concentrated and becomes much more soluble in water, as the equilibrium concentration of dissolved gas in water increases as gas pressure in contact with the water increases. Through experiments using system 100 to dissolve gaseous ozone into water and mathematical modeling of the process, the present inventor discovered that the dissolved ozone concentration could be dramatically increased in water by taking advantage of the fact that ozone is far more soluble in water than oxygen. The present invention could, alternatively, be used to maximize the dissolved gas concentration of a different single species of gas (i.e. other than ozone gas) that is more soluble in the water than the other gases in the gas mixture.

Feed gas to an ozone generator is typically pure oxygen gas and the gas exiting the ozone generator is typically 10-15% ozone and 85-90% oxygen. The gas in the pressure vessel/saturation chamber 14 that makes up the headspace 18 will remain in the headspace 18 until it dissolves in the water. Since the water level in the vessel 18 is controlled using inlet water flow regulation, the volume and pressure of the gas headspace remains constant during operation. In order for more gas to flow into the pressure vessel, gas in the headspace must be dissolved into the water and exit the tank within the water. As this occurs, gas from the ozone generator 32 flows into the vessel headspace 18 to replace that dissolved in the water in order to maintain the regulated pressure and water level. Since the solubility of ozone in water is higher than oxygen in water (10.7 times more soluble at 20° C. from Henry's constant for ozone v. oxygen Perry's Chemical Engineering Handbook) the gradient between the concentration of ozone in gas to that in equilibrium with water will be much greater than that for oxygen in gas and water. The magnitude of this gradient is directly proportional to the rate at which the gases dissolve into the water if the contact conditions such as, surface area, are the same between the liquid and each gas (oxygen and ozone).

Within the pressure vessel of system 100, the contact conditions between gas and water are the same as the gas headspace is a mixture of ozone and oxygen gas. Since the ozone dissolves into the water at a faster rate than the oxygen, the ozone gas will leave the gas mixture in the headspace more quickly than the oxygen gas. As ozone leaves the gas state in the headspace at a faster rate than oxygen and the gas replacing that dissolved has an oxygen/ozone ratio no greater than the initial gas concentration ratio, the gas remaining in the headspace will develop a higher concentration of oxygen than the feed gas and a lower concentration of ozone than the feed gas. Therefore, the concentration of oxygen in the gas in the headspace will rise relative to that of ozone. As the concentration of ozone is reduced relative to oxygen, the rate of ozone dissolving into the water will slow until the relative concentration of ozone to oxygen in the gas headspace is such that the both rates reach steady-state. This steady-state concentration of ozone in the gas headspace is much less than the ozone concentration in the feed gas entering the vessel.

Figure 2:
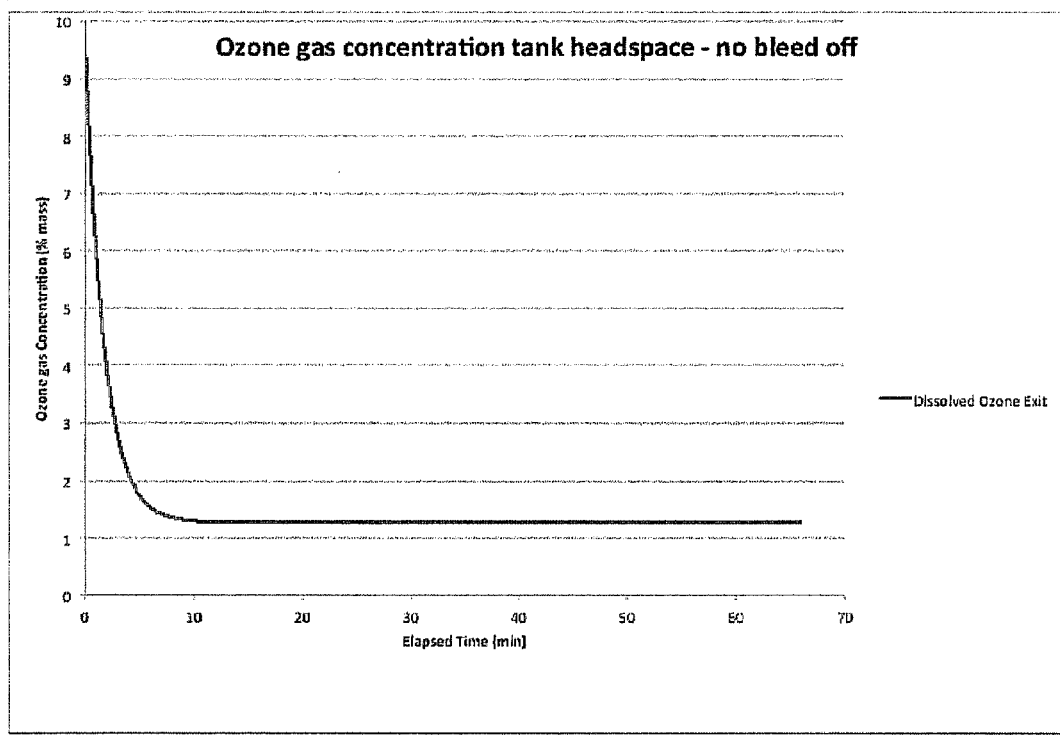
FIG. 2 is a graphical representation showing the change in ozone concentration over time in the headspace of the dissolution tank of the system shown in FIG. 1.
Figure 3:
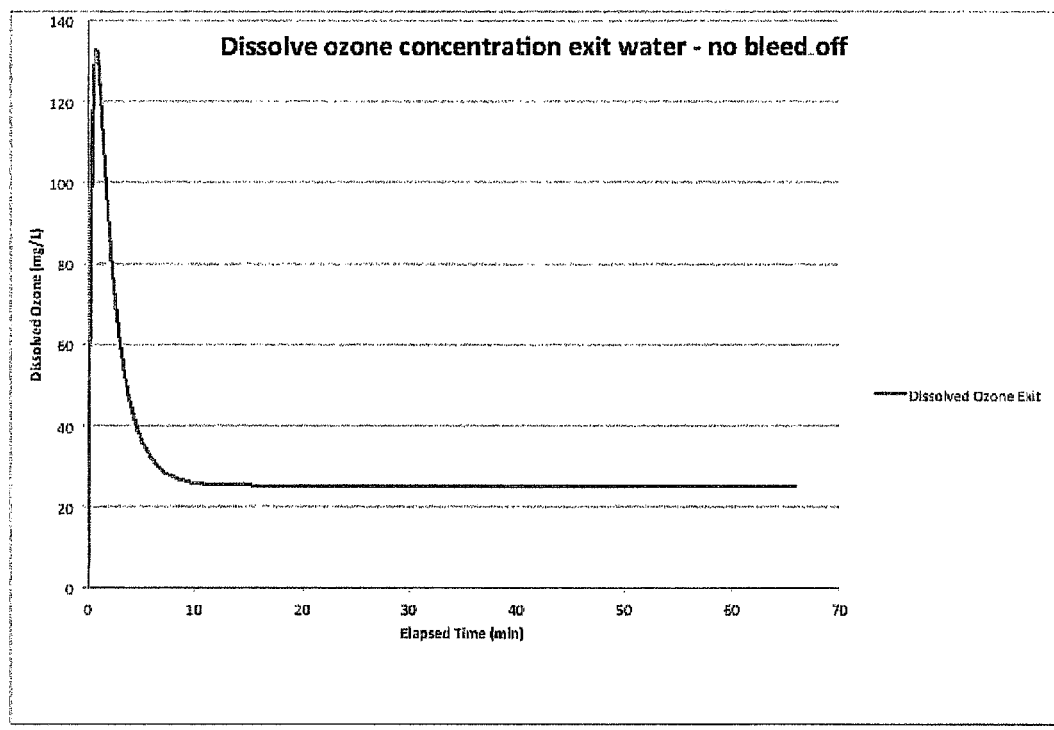
FIG. 3 is a graphical representation illustrating the change in ozone concentration over time in the water exiting the dissolution tank of the system shown in FIG. 1.

The graph provided in FIG. 2 provides the results of a simulation model run on the output of system 100 and illustrates this phenomenon. In the simulation, the pressure vessel is initially filled with ozone and oxygen gas at 10% ozone and 90% oxygen. The gas is compressed to 80 psi resulting in a high partial pressure of both oxygen and ozone. As the system 100 operates, the water strips the ozone gas from the headspace resulting in a drop in the ozone concentration to just over 1% by mass at steady-state conditions even though the feed gas concentration remains at 10% ozone because of non-dissolution of oxygen gas and buildup in the headspace. FIG. 3 shows the penalty this inflicts on the dissolved ozone concentration exiting the system 100. FIG. 3 is also from the simulation model run on system 100 based on Henry's Law and shows the dissolved ozone in water exiting the system. As the concentration of ozone in the gas headspace in the tank is reduced, the dissolved ozone in water is reduced to 25 mg/L, which is consistent with measured values obtained when operating system 100. However, FIG. 3 also shows that for a brief few minutes of operation of system 100, the dissolved ozone concentration is very, very high reaching 130 mg/L. However, this high concentration cannot be maintained.

The result of this phenomenon is that the rate of dissolved ozone delivered from system 100 will be at a maximum when the unit is first activated, but will fall to the lower steady-state rate within 15 minutes. The dissolved ozone concentration in the water exiting system 100 is still substantial compared to prior art system even with this reduced ozone gas concentration in the headspace and has been measured to be 20 to 25 mg/L.

The present invention 200 provides a solution to this problem by providing a gas exit in the headspace of the pressure vessel to allow the high concentration oxygen gas to exit the headspace while it is replaced with higher ozone concentration gas from the ozone generator. This will allow the dissolved ozone concentration in the water exiting the tank 2 to be substantially greater than existing values not utilizing the gas bleed-off.

Additionally, rather than feeding the ozone gas directly into the headspace 18, in system 200 the ozone rich gas is fed from the ozone generator to beneath the liquid level in the tank such that a counter flow contact process is created. As a result, the ozone gas can be differentially dissolved in the water, such that it will minimize the ozone concentration in the gas headspace 18 that is removed through bleed-off and maximize the concentration of the waste oxygen that is bled off. Feeding the gas beneath the liquid will also allow the liquid to act as a short-term physical barrier between the lower ozone concentration gas in the headspace above the liquid and the higher ozone concentration gas entering the water. This physical barrier will minimize mixing between the highest ozone concentration and lowest ozone concentration gas resulting in the lower ozone concentration gas being predominantly bled-off and the higher concentration ozone gas being exposed to water. The higher concentration ozone gas, therefore, is dissolved in the water prior to mixing with the headspace gas and is expelled from the tank.

As shown in FIG. 4, bleed-off system 50 includes a bleed-off control valve 40, which regulates the removal of gas from the headspace 18. Those skilled in the art will readily appreciate that control valve 40 can be manually operated or automated using one or more electronic controllers. Bleed-off system 50 can also include an ozone destruction unit 42 to convert unused ozone back to oxygen and a water vapor removal system 44. The oxygen that is bled from the pressure vessel 14 contains energy that can be utilized to transport the oxygen gas through a series of drying chemical beds and ozone destruction reactor to recover nearly pure oxygen for feedback into the ozone generator 32 through a second control valve 46.

As a result, system 200 minimizes the oxygen gas supply requirements, since the only way the feed gas escapes the system is by dissolving in the water and lowers the operating cost by providing 100% utilization of the oxygen supply gas.

FIG. 5 from an ozone simulation model shows the effect of continuous bleed-off of gas within the headspace on the ozone concentration in the gas headspace. Although the steady-state concentration of ozone is less than the initial 10% concentration, the steady-state value is increased to over 2% ozone gas by mass, which is nearly double the concentration without bleed off. FIG. 6 illustrates the effect bleed-off system 50 has on the dissolved ozone concentration exiting the system 200. The dissolved ozone concentration has been increased from 25 mg/L to nearly 50 mg/L without changing the physical size of system 200. Bleed off system 50 allows ozone generators of increased capacity to be used to substantially increase delivery rate of dissolve ozone or to maintain the same overall delivery rate at a higher concentration.

Still further the bleed-off of oxygen gas by bleed off system 50 can be done continuously or in a pulsing process optimized to maximize and control the dissolved ozone concentration in the water exiting system 200. The peak values for dissolved ozone shown in FIGS. 3 and 6 indicate that a pulsing method, which exposes water spray to ozone gas at a 10% concentration under pressure, could result in very high dissolved ozone concentrations.

When the inventive method of the present invention is operated in a continuous mode of operation (i.e. continuous liquid spray and continuous gas bleed-off), a constant stream of fluid containing the dissolved gas is provided at a constant dissolved gas concentration. In this operation, the concentrations of the multitude of gases exiting from the bleed-off gas stream are also constant. The continuous mode of operation will provide the maximum continuous dissolved gas concentration for treatment, but may not be the mode of operation that requires the lowest operating costs or provides the maximum dissolved gas concentration for periodic operation. If the bleed-off portion is operated in a periodic mode, then a lower cost of operation may be attained for certain applications of treatment.

There are two periodic modes of operation. In the first periodic mode of operation, the gas is removed periodically from the gas headspace with continuous liquid entry into the saturation chamber of the pressure vessel. In the second periodic mode of operation, the liquid spray into the saturation chamber of the pressure vessel is operated in a pulsing mode with periodic gas bleed off.

In a representative method of operational mode with periodic bleed-off and continuous liquid entry flow, the periodic gas bleed-off operation is conducted by initially permitting feed gas to flow into saturation chamber of the pressure vessel 14 with the bleed-off valve 40 closed until a desired pressure in the chamber is attained. When the desired chamber pressure is reached, the inlet gas valve 30 is closed thus stopping the flow of gas fed from the source into the saturation chamber of the pressure vessel. The flow rate of liquid into and out of the saturation chamber of the pressure vessel is equal as controlled by a level indicator/transmitter that controls the flow of liquid entering the saturation chamber of the pressure vessel. The gas in the headspace 18 is slowly consumed without replacement as it is dissolved into the liquid stream thereby reducing the pressure in the saturation chamber of the pressure vessel. Once the pressure in the saturation chamber of the pressure vessel reaches an optimal value as determined by the optimal concentration of the remaining target gas (ozone) in the headspace gas, the bleed-off valve 40 is opened releasing the gas headspace in the chamber such that the pressure in the saturation chamber of the pressure vessel is near ambient pressure. The bleed-off valve 40 is then closed and feed gas inlet valve 30 is opened allowing feed gas to once again pressurize the saturation chamber of the pressure vessel to the initial desired optimal pressure. Programmable control over liquid flow rate entering the saturation chamber of the pressure vessel will maintain liquid level at desired values during periodic operation of the gas headspace bleed-off.

In a representative method of operational mode with pulse liquid spray and periodic gas bleed-off, the initial feed gas is forced into the saturation chamber of the pressure vessel through the open inlet gas valve 30 under conditions such that saturation chamber of the pressure vessel 14 is nearly full with liquid while the bleed-off valve 40 is closed. The pressurized feed gas pushes the liquid out of the saturation chamber of the pressure vessel through the liquid outlet 22 on the bottom of the saturation chamber of the pressure vessel. Therefore, the saturation chamber of the pressure vessel is filled with feed gas at the initial concentration (of ozone/oxygen mixture). Once filled with gas at a pressure near and slightly above ambient, the gas inlet valve 30 is closed and the liquid inlet valve 52 is opened allowing liquid spray to pass through the gas headspace thereby dissolving gas into the liquid. The liquid outlet valve 48 is closed so liquid cannot exit the saturation chamber of the pressure vessel. The liquid level in the chamber will rise, thereby pressurizing the contents of the chamber. Once the liquid level reaches the optimal level indicated by pressure and/or dissolved gas concentration, the liquid outlet valve 48 is opened allowing the gas saturated liquid to exit the saturation chamber of the pressure vessel. Once the liquid level is reduced to the optimal level determined by pressure or liquid flow rate, the liquid outlet valve 48 is closed and the liquid inlet valve 52 is opened once again allowing liquid spray to enter the chamber and raise the liquid level and pressure. The liquid entry pulsing operation is repeated while the gas headspace is retained in the chamber until all of the usable target gas is extracted from the headspace and dissolved into the liquid. Once the gas headspace is optimally consumed, the bleed-off valve 40 is opened, the liquid outlet valve 48 is closed and liquid inlet valve 52 is opened to fill the saturation chamber of the pressure vessel with liquid thereby forcing nearly all of the gas to exit the chamber out bleed off valve 40. Once the gas has been removed from the saturation chamber of the pressure vessel, the process is repeated by closing the bleed-off valve 40, opening the liquid outlet valve 48 and the inlet gas valve 30, and filling the saturation chamber of the pressure vessel with feed gas to a pressure slightly exceeding ambient.

Because of the difference in solubility of each gas species in the liquid and different partial pressure of each gas species, the preferred gas (ozone in the case of an oxygen/ozone gas mixture) will be differentially removed from the headspace 18 such that the concentration (partial pressure) of the preferred gas will be slightly less in the headspace 18 after each spray cycle of liquid into the vessel 14. The cycle of spraying liquid into the sealed vessel 14 to pressurize the liquid and headspace 18 can be repeated for as many cycles as optimal until the concentration of the preferred gas in the headspace 18 is reduced to a partial pressure below the optimal level.

The advantage of the periodic bleed-off modes of operation is that the amount of gas wasted (not dissolved in the liquid and bled off) can be minimized, potentially reducing operating costs. The liquid flow exiting the vessel 14 for treatment may not be at a constant rate and the dissolved gas concentration in the liquid will be reduced with each liquid pulsing cycle. To partially overcome these limitations, the present invention can be operated as two or more vessels providing liquid flow in parallel such that when one vessel is undergoing the liquid spray pressurization step and the exit flow is limited, another vessel can be timed to operate such that the liquid exit flow is maximized. Using the same logic, when one of the vessels is operating such that the dissolved gas concentration is low near the end of the spray pressurization cycles, other vessels can be timed to operate such that the dissolved gas concentration is near the beginning of the cycles and the dissolved gas concentration is near maximum. Timed operation varying the phase of the spray pressurization cycles can be controlled to provide a near constant liquid flow rate and dissolved gas concentration for downstream treatment.

During the first spray pressurization cycles of the periodic bleed-off operation of the present invention, the dissolved gas concentration of the preferred gas may be substantially greater than the dissolved gas concentration attainable using continuous bleed-off. Therefore, periodic bleed-off operation may provide a treatment advantage other than low operating cost because of the very high dissolved gas concentration that can be attained. The size and shape of the vessel that the liquid spray is entering, and pressurizing the gas headspace, can be designed to maximize or optimize the dissolved gas concentration in the exit liquid.

It should be appreciated that the typical dissolved ozone concentration in competing prior art systems is around 8 mg/L. System 100 allowed that concentration to be increased to 25 mg/L. By bleeding off the excess oxygen gas contained within the headspace, the full potential of the ozone concentration produced by commercially available ozone generators can be realized, so that gas having a 15% ozone concentration can be dissolved in water differentially such that the predicted concentration from Henry's Law of 560 mg/L could be realized. This would greatly reduce the cost of delivering ozone to water for disinfection, oxidation of chemicals, sterilization of food and food processing equipment to be done with a very small amount of water (1/22 compared to system 100 and 1/70 compared to standard ozone technology). This reduction in water usage translates directly to lower energy usage and costs. Higher concentrations of dissolved ozone can also allow for more effective control over the treatment processes by ensuring a high ozone dose that may allow oxidation of target chemical that cannot be properly treated using current systems delivering lower ozone concentrations.

It will be apparent to those skilled in the art that numerous other variations of the described system for optimizing the dissolution of a gas into a liquid are possible without departing from the scope of the invention.

The invention claimed is:

1. An apparatus for maximizing the dissolved concentration of ozone in a liquid comprising:
   (a) a dissolution tank which includes: (i) a pressure vessel configured to contain a treated fluid and a gas mixture in a headspace above the treated fluid, (ii) at least one inlet configured to permit passage of an untreated fluid into the head space so as to dissolve a portion of the gas mixture contained in the head space in the untreated fluid, and (iii) an outlet configured to permit passage of the treated fluid out of the pressure vessel;
   (b) a gas supply system configured to transport the gas mixture at a first ozone-oxygen concentration from a gas source directly to the headspace contained in the pressure vessel;
   (c) a fluid supply system configured to provide the untreated fluid from a fluid source to the at least one inlet of the dissolution tank;
   (d) a bleed-off system configured to remove the gas mixture at a second ozone-oxygen concentration from the headspace so as to maximize the dissolved concentration of the ozone gas in the treated fluid; and
   (e) a discharge device external to the dissolution tank, in communication with the outlet, and immersed in a target liquid, the discharge device configured to pass the treated fluid from the dissolution tank into the target liquid.

2. The apparatus as recited in claim 1, wherein the bleed-off system is configured to operate in a periodic or a continuous mode.

3. The apparatus as recited in claim 1, further comprising an ozone generator which is in communication with the gas source.

4. The apparatus as recited in claim 3, further comprising a gas line configured to provide at least a portion of the gas mixture removed from the gas headspace to the ozone generator.

5. The apparatus as recited in claim 1, wherein the bleed-off system includes a control valve and a water vapor removal system for conditioning the gas removed from the gas headspace.

6. The apparatus as recited in claim 2, wherein the apparatus is configured to maintain the gas headspace at a mass concentration of ozone in excess of about 2% when the apparatus is operating in a continuous mode.

7. The apparatus as recited in claim 2, wherein the apparatus is configured to contain the treated liquid at a dissolved ozone concentration of between about 5 mg/L and about 50 mg/L when the bleed-off system is operating in the continuous mode.

8. A method for maximizing the dissolved concentration of ozone in a liquid comprising the steps of:
   (a) providing a dissolution tank which includes: (i) a pressure vessel configured to contain a treated fluid and a gas mixture in a headspace above the treated fluid; (ii) at least one inlet configured to permit passage of an untreated fluid into the headspace to dissolve the gas contained in the headspace in the untreated fluid; and (iii) an outlet configured to permit passage of the treated fluid out of the pressure vessel;
   (b) supplying the untreated fluid from a fluid source to the at least one inlet of the dissolution tank;
   (c) supplying the mixture from a gas source directly to the headspace contained in the pressure vessel, wherein the gas mixture supplied to the headspace has a first ozone-oxygen concentration;
   (d) bleeding-off the gas mixture from the gas headspace so as to maximize the dissolved concentration of ozone in the treated fluid, wherein the gas mixture bled-off has a second ozone-oxygen concentration;
   (e) discharging the treated fluid from the outlet of the dissolution tank to a discharge device, the discharge device being immersed in a target liquid; and
   (f) supplying the treated fluid from the discharge device to the target liquid.

9. The method of maximizing the dissolved concentration of ozone in a liquid as recited in claim 8, wherein in the step of bleeding-off gas having a second ozone-oxygen concentration from the gas headspace, the gas is bled-off continuously.

10. The method for maximizing the dissolved concentration of ozone in a liquid as recited in claim 8, wherein in the step of bleeding-off gas from the gas headspace, the gas is bled-off periodically.

11. The method for maximizing the dissolved concentration of ozone in a liquid as recited in claim 10, wherein the periodic bleed-off step is conducted by:
   (a) providing feed gas to the pressure vessel until the desired initial operating pressure is attained with a bleed-off valve closed;
   (b) closing an inlet gas valve such that gas no longer enters the pressure vessel;
   (c) opening the bleed valve when the optimal dissolved ozone concentration is achieved so as to vent the headspace of the pressure vessel; and
   (d) repressurizing the pressure vessel with the feed gas.

12. The method for maximizing the dissolved concentration of ozone in a liquid as recited in claim 10, wherein the periodic bleed-off step is conducted by:
   (a) providing feed gas to the pressure vessel nearly full with water with a bleed-off valve closed and a liquid outlet open so the water is replaced with the gas having a first ozone-oxygen concentration;
   (b) closing a gas inlet valve such that gas no longer enters the pressure vessel;
   (c) opening a liquid inlet valve to allow liquid to flow through at least one inlet to fill the tank and pressurize the gas while dissolving gas into the liquid;
   (d) closing the liquid inlet valve and opening a liquid outlet valve allowing the liquid containing the dissolved gas to exit the tank;
   (e) closing the liquid outlet valve and repeat steps (c) through (e) until the optimal amount of headspace gas is dissolved into the liquid;
   (f) opening the bleed-off valve when the optimal dissolved ozone concentration is achieved so as to vent the headspace of the pressure vessel;
   (g) refilling the tank with water at near atmospheric pressure and repeat steps (a) through (g).

13. The method for maximizing the dissolved concentration of ozone in a liquid as recited in claim 10, wherein the periodic bleed-off step includes the steps of:
   (a) providing a second dissolution tank that is arranged in parallel with the first dissolution tank;
   (b) filling the first pressure vessel with feed gas from an ozone generator until a desired ozone-oxygen concentration is achieved;
   (c) closing a valve associated with the first pressure vessel so as to seal the first pressure vessel from feed gas;
   (d) providing the feed gas to the second dissolution tank assembly which has separate bleed-off timing;
   (e) filling the second pressure vessel with fluid through at least one inlet of the second pressure vessel, which simultaneously increases the pressure inside the second pressure vessel and dissolves ozone gas into a fluid spray; and
   (f) opening an outlet of the second dissolution tank when the dissolved ozone concentration of liquid in the pressure vessel reaches a desired value thereby discharging the liquid containing dissolved ozone into the target liquid.

\* \* \* \* \*